US010045001B2

(12) United States Patent
Anderson

(10) Patent No.: US 10,045,001 B2
(45) Date of Patent: Aug. 7, 2018

(54) POWERING UNPOWERED OBJECTS FOR TRACKING, AUGMENTED REALITY, AND OTHER EXPERIENCES

(71) Applicant: INTEL CORPORATION, Santa Clara, CA (US)

(72) Inventor: Glen J. Anderson, Beaverton, OR (US)

(73) Assignee: INTEL CORPORATION, Santa Clara, CA (US)

(*) Notice: Subject to any disclaimer, the term of this patent is extended or adjusted under 35 U.S.C. 154(b) by 197 days.

(21) Appl. No.: 14/960,093

(22) Filed: Dec. 4, 2015

(65) Prior Publication Data
US 2017/0163957 A1 Jun. 8, 2017

(51) Int. Cl.
*H04N 9/87* (2006.01)
*G01S 3/04* (2006.01)
(Continued)

(52) U.S. Cl.
CPC ........... *H04N 9/8715* (2013.01); *G01S 3/046* (2013.01); *G06K 7/10297* (2013.01);
(Continued)

(58) Field of Classification Search
CPC ......... A63H 2200/00; A63F 2009/2489; A63F 3/00643; A63F 2009/2429;
(Continued)

(56) References Cited

U.S. PATENT DOCUMENTS

2004/0229696 A1* 11/2004 Beck ................ A63F 13/02
463/40
2006/0087442 A1* 4/2006 Smith ................ G06K 19/06
340/686.1
(Continued)

FOREIGN PATENT DOCUMENTS

EP 2887253 6/2015
KR 10-2011-0136018 12/2011
WO 2015102862 7/2015

OTHER PUBLICATIONS

Notification of Transmittal of the International Search Report and the Written Opinion of the International Searching Authority issued for International Patent Application No. PCT/US2016/055566, dated Jan. 17, 2017.

*Primary Examiner* — Sultana M Zalalee
(74) *Attorney, Agent, or Firm* — Womble Bond Dickinson (US) LLP

(57) ABSTRACT

A mechanism is described for facilitating powering of unpowered objects for tracking, augmented reality, and other experiences according to one embodiment. A method of embodiments, as described herein, includes scanning, by a scanner of a computing device, an object, where the object includes an unpowered object, and where the scanner is further to detect a smart tag at the object. The method may further include providing power, by the computing device, to the object, where the power is provided via the smart tag at the object, where providing power includes initiating an output from the object to enable performing of location tracking of the object, where the output is received by the computing device. The method may further include rendering an augmented reality (AR) experience involving the object, where the AR experience is based on the output.

29 Claims, 8 Drawing Sheets

(51) Int. Cl.
*G06K 7/10* (2006.01)
*G06T 19/00* (2011.01)
*H04N 5/77* (2006.01)

(52) U.S. Cl.
CPC .......... *G06K 7/10386* (2013.01); *G06T 19/00* (2013.01); *G06T 19/006* (2013.01); *G06K 2007/10524* (2013.01); *H04N 5/77* (2013.01)

(58) Field of Classification Search
CPC ...... A63F 2009/2433; A63F 2009/2435; A63F 2009/2439; A63F 2009/2486; A63F 2300/6045; A63F 3/00214; A63F 9/001; G06T 19/006; G06F 21/31; G06F 21/34; H04N 1/00244; H04N 1/00342; H04N 1/32101; H04N 5/23219
See application file for complete search history.

(56) References Cited

U.S. PATENT DOCUMENTS

| | | |
|---|---|---|
| 2012/0049453 A1* | 3/2012 | Morichau-Beauchant ................ A63F 3/00214 273/236 |
| 2013/0155107 A1 | 6/2013 | Ashour et al. |
| 2013/0176414 A1* | 7/2013 | Hwang ................ G01S 17/026 348/77 |
| 2014/0125574 A1* | 5/2014 | Scavezze ................ G06F 21/31 345/156 |
| 2014/0206253 A1* | 7/2014 | Huyck ................ A63H 30/04 446/175 |
| 2014/0292807 A1* | 10/2014 | Raffa ................ G06T 19/006 345/633 |
| 2014/0295731 A1 | 10/2014 | Weston |

* cited by examiner

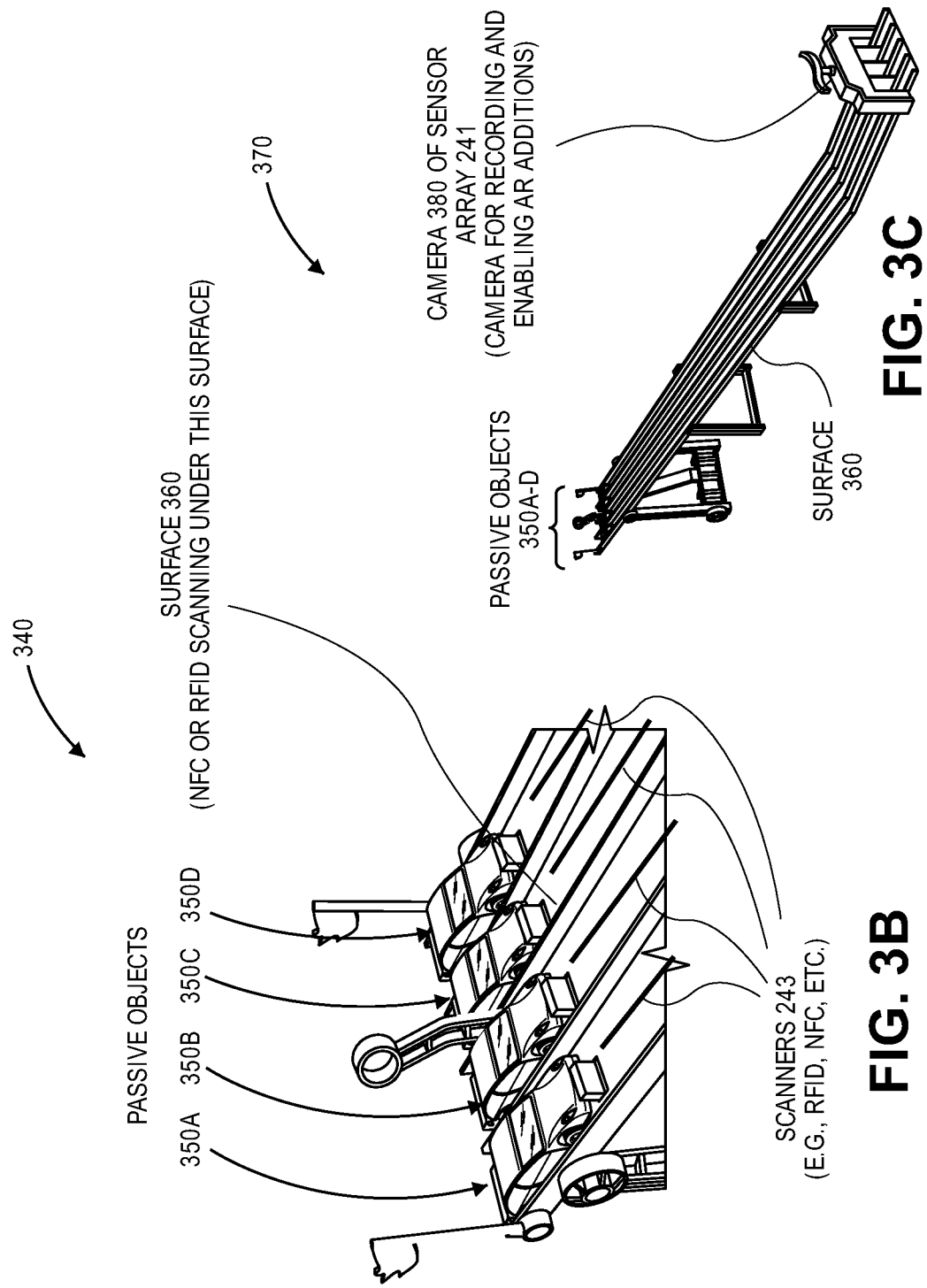

US 10,045,001 B2

POWERING UNPOWERED OBJECTS FOR TRACKING, AUGMENTED REALITY, AND OTHER EXPERIENCES

FIELD

Embodiments described herein generally relate to computers. More particularly, embodiments relate to facilitating powering of unpowered objects for tracking, augmented reality, and other experiences.

BACKGROUND

Identification and subsequent camera tracking of objects can be useful with regard to several applications, such as augmented reality (AR) usages; however, visual identification of an object is cumbersome and unproductive due to distance, occlusion, similarity to other objects, etc. Conventional techniques do not provide for identifying and tracking of unpowered objects that are incapable of communicating or being connected using a network, such as a proximity networks.

BRIEF DESCRIPTION OF THE DRAWINGS

Embodiments are illustrated by way of example, and not by way of limitation, in the figures of the accompanying drawings in which like reference numerals refer to similar elements.

FIGS. 3B and 3C illustrates a use case scenarios according to one embodiment.

DETAILED DESCRIPTION

In the following description, numerous specific details are set forth. However, embodiments, as described herein, may be practiced without these specific details. In other instances, well-known circuits, structures and techniques have not been shown in details in order not to obscure the understanding of this description.

Embodiments provide for a novel technique that uses radio-frequency identification (RFID) technology to enable one or more input/output components (e.g., camera) for tracking (e.g., camera tracking) unpowered objects (e.g., toys). This novel technique allows for unpowered objects to remain inexpensive, flexible, any size, and free of any conventional power components (e.g., battery, chargers, adaptors, etc.), etc.

For example, a powered tracking device (also referred to as "powered device", "tracker", "active device" or simply "device") may be capable of employing a tracking component (e.g., camera) and providing ("issuing" or "transmitting") wireless power to an unpowered object (also referred to as "unpowered object", "trackee", "passive object", or simply "object") that is being tracked using an RFID scan of a smart tag (e.g., RFID tag, near-field communication (NFC) tag, etc.) that is placed at the object. In one embodiment providing power including issuing or transmitting the power from the powered device to the unpowered device. This location tracking of the object provides for better detection and recognition of the object without having the need to alter the object or rely on any conventional tracking means (e.g., human eyes, binoculars, etc.). This location tracking may be used for rendering an AR experience involving the unpowered object, where the location tracking is further to alter one or more behaviors of the unpowered object based on supplemental information relating to the unpowered object and retrieved from one or more databases.

It is contemplated and to be noted that embodiments are not limited to any particular number and type of powered devices, unpowered objects, software applications, application services, customized settings, etc., or any particular number and type of computing devices, networks, deployment details, etc.; however, for the sake of brevity, clarity, and ease of understanding, throughout this document, references are made to powered devices, unpowered objects, toys, RFID tags, NFC tags, user interfaces, software applications, user preferences, customized settings, mobile computers (e.g., smartphones, tablet computers, etc.), communication medium/network (e.g., cloud network, the Internet, proximity network, Bluetooth, etc.), but that embodiments are not limited as such.

Figure 1:
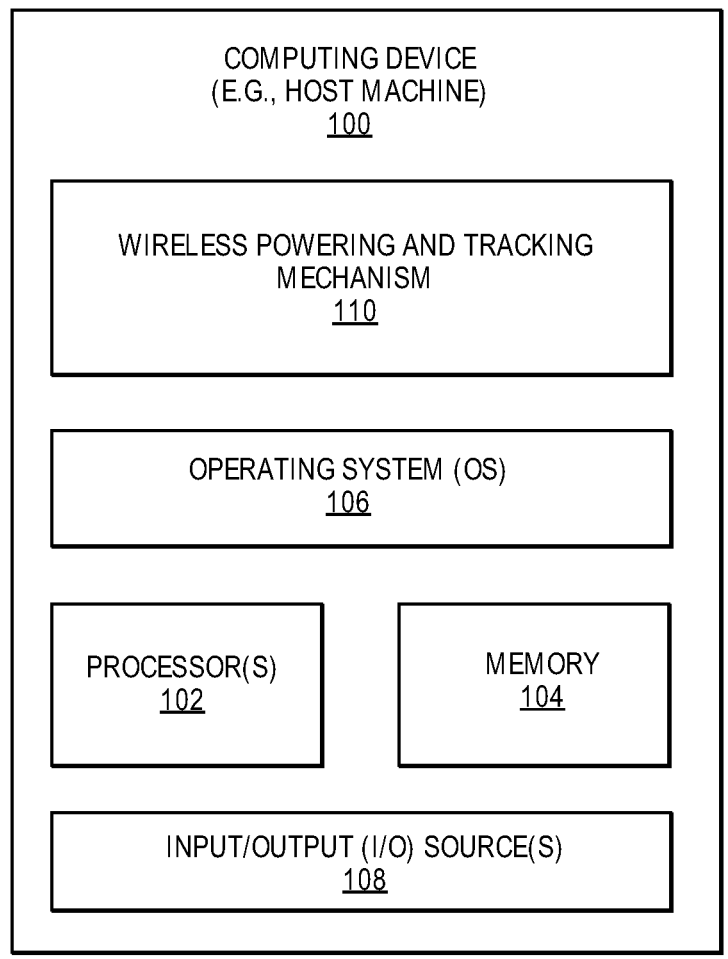
FIG. 1 illustrates a computing device employing a wireless powering and tracking mechanism according to one embodiment.

FIG. 1 illustrates a computing device 100 employing a wireless powering and tracking mechanism 110 according to one embodiment. Computing device 100 (e.g., active device, powered device, etc.) serves as a host machine for hosting smart wireless powering and tracking mechanism ("powering/tracking mechanism") 110 that includes any number and type of components, as illustrated in FIG. 2, to facilitate smart powering and tracking of unpowered objects for any number and type of purposes, such as detecting, tracking, AR usages, etc., using RFID scans and tags, etc., as will be further described throughout this document.

Computing device 100 may include any number and type of data processing devices, such as large computing systems, such as server computers, desktop computers, etc., and may further include set-top boxes (e.g., Internet-based cable television set-top boxes, etc.), global positioning system (GPS)-based devices, etc. Computing device 100 may include mobile computing devices serving as communication devices, such as cellular phones including smartphones, personal digital assistants (PDAs), tablet computers, laptop computers (e.g., Ultrabook™ system, etc.), e-readers, media internet devices (MIDs), media players, smart televisions, television platforms, intelligent devices, computing dust, media players, head-mounted displays (HMDs) (e.g., wearable glasses, such as Google® glass™, head-mounted binoculars, gaming displays, military headwear, etc.), and other wearable devices (e.g., smart watches, bracelets, smartcards, jewelry, clothing items, etc.), and/or the like.

Computing device 100 may include an operating system (OS) 106 serving as an interface between hardware and/or physical resources of the computer device 100 and a user. Computing device 100 further includes one or more processor(s) 102, memory devices 104, network devices, drivers, or the like, as well as input/output (I/O) sources 108, such as touchscreens, touch panels, touch pads, virtual or regular keyboards, virtual or regular mice, etc.

It is to be noted that terms like "node", "computing node", "server", "server device", "cloud computer", "cloud server", "cloud server computer", "machine", "host machine", "device", "computing device", "computer", "computing system", and the like, may be used interchangeably throughout this document. It is to be further noted that terms like "application", "software application", "program", "software program", "package", "software package", "code", "software code", and the like, may be used interchangeably throughout this document. Also, terms like "job", "input", "request", "message", and the like, may be used interchangeably throughout this document. It is contemplated that the term "user" may refer to an individual or a person or a group of individuals or persons using or having access to one or more computing devices, such as computing device 100.

Figure 2A:
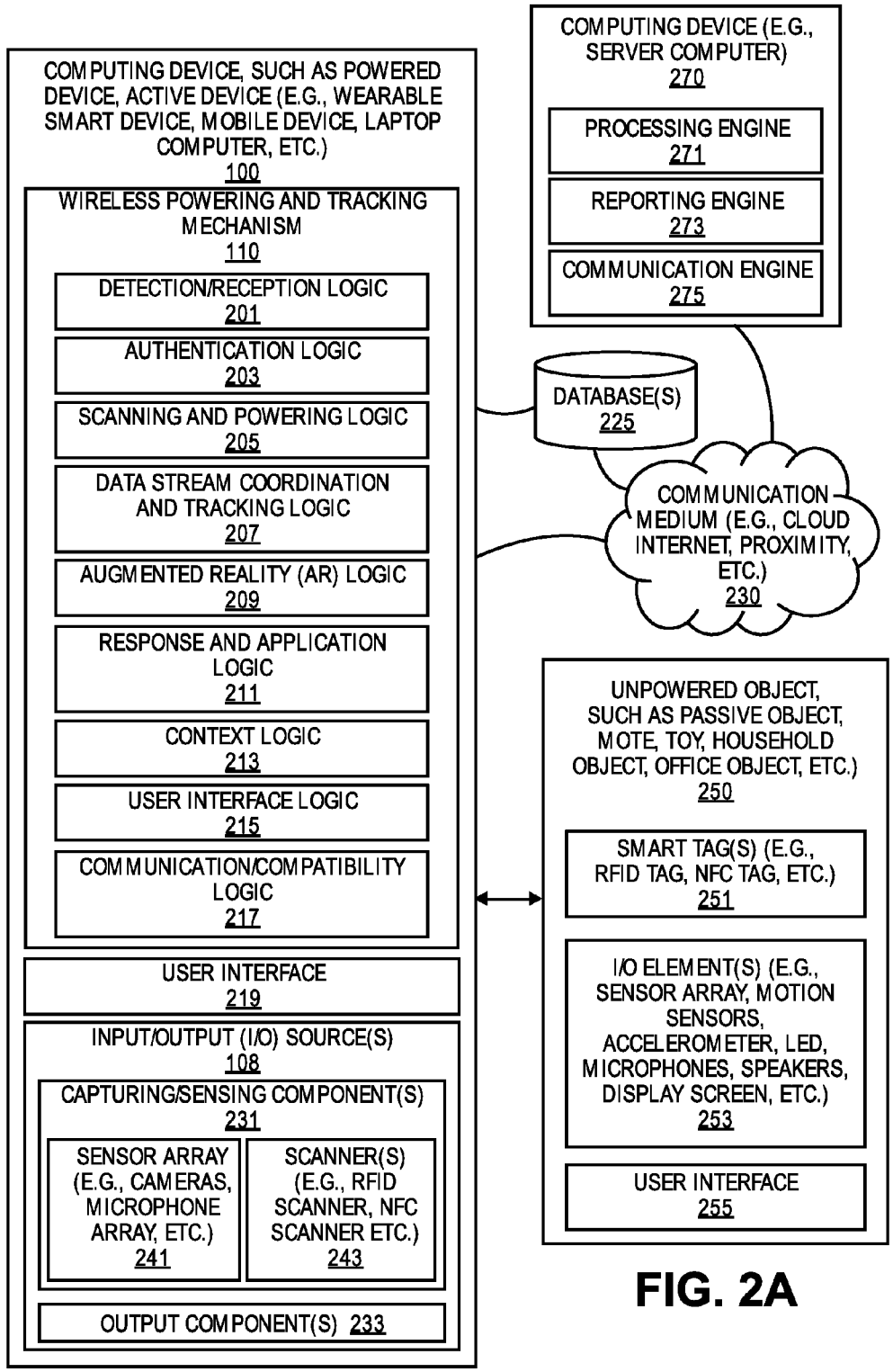
FIG. 2A illustrates a wireless powering and tracking mechanism according to one embodiment.

FIG. 2A illustrates a wireless powering and tracking mechanism 110 according to one embodiment. In one embodiment, powering/tracking mechanism 110 may include any number and type of components, such as (without limitation): detection/reception logic 201; authentication logic 203; scanning and powering logic 205; data stream coordination and tracking logic ("coordination and tracking logic") 207; AR rendering logic 209; response and application logic 211, context logic 213, user interface logic 215, and communication/compatibility logic 217. In one embodiment, user interface logic 215 may be used to facilitate user interface 219 at computing device 100 and, in another embodiment, user interface logic 215 may be further used to facilitate user interface 255 at unpowered object 250.

Computing device 100 (hereafter referred to as "active device") (e.g., mobile computer (e.g., smartphone, tablet computer, etc.), wearable smart device (e.g., HMD, smart glasses, etc.), laptop computer, IoT device, etc.) is further shown as hosting I/O sources 108 having capturing/sensing components 231 and output sources 233. In one embodiment, capturing/sensing components 231 may include sensor array 241 (such as microphones or microphone array (e.g., ultrasound microphones), cameras or camera array (e.g., two-dimensional (2D) cameras, three-dimensional (3D) cameras, infrared (IR) cameras, depth-sensing cameras, etc.), capacitors, radio components, radar components, etc.), scanners 243, etc., while output components 233 may include display screens/devices, projectors, speakers, etc.

As illustrated, the object that is being tracked by active device 100 is shown as unpowered object (hereafter referred to as "passive object") 250 (e.g., mote, sensor node, etc.) having one or more components, such as smart tags 251 (e.g., RFID tag, NFC tag, etc.), I/O elements 253 (e.g., sensor array, motion sensors, accelerometers, microphones, light-emitting diodes (LEDs), speakers, display screens, etc.).

In one embodiment, active device 100 may be further in communication with one or more databases, such as database(s) 225, and one or more other computing devices, such as computing device 270 (e.g., server computer), to provide additional data, information, processing, report, analysis, etc., for active device 100 to use. For example, computing device 270 (hereinafter referred to as "server computer") may include a cloud-based server computer having one or more components, such as processing engine 271, reporting engine 273, and communication engine 275, capable of performing any number and type of tasks and communicating with active device 100 over communication medium 230, such as one or more networks (e.g., cloud network, Internet, proximity network, etc.).

Referring back to powering/tracking mechanism 110, for example, detection/reception logic 201 may detect passive object 250 by, for example, detecting smart tags 251, capturing an image or audio of passive object 250 through a camera or a microphone, respectively, of sensor array 241. Once passive object 250 is detected by detection/reception logic 201, passive object 250 may be authenticated by authentication logic 203. It is contemplated that in some embodiments, as desired or necessitated, this authentication process may range from being option or minimal (such as in cases of passive object 250 being a toy, simply authenticating the presence of passive object 250 might suffice) to extensive (such as when passive object 250 is a significant object, such as a jewelry set, a briefcase having important contents, etc., authentication process may include verifying a passcode, matching a unique identifier associated with passive object 250 and/or a user having access to passive object 250, etc.).

For example, as facilitated by authentication logic 203, authentication may be performed in any number and type of ways, such as by capturing an image of passive object 250 or a portion (e.g., registration label, etc.) of passive object 250 using a camera of sensor array 241 or scanning personal device 250 using scanners 243, where any information, such as identification (ID), unique passcode, etc., may be communicated back to active device 100 by passive object 250 using, for example, smart tags 251, as will be further described in this document.

In one embodiment, scanning and powering logic 205 may then be triggered to facilitate one or more scanners 243 to perform scanning of passive object 250, such as by having an RFID scanner or an NFC scanner of scanners 243 to scan an RFID tag or an NFC tag, respectively, of smart tags 251. It is contemplated that scanning and powering logic 205 may include scanning apparatus, such as RFID scanners circuitry, etc., or scanning software components or any combination thereof, such as scanning firmware. As aforementioned, in one embodiment, active device 100 may provide wireless power to passive object 250 through scanning of smart tags 251 by scanners 243 to enable better detection and recognition of passive object 250 for any number and type of purposes, such as identification purposes, AR usages, other application usages, etc. In one embodiment, providing wireless power includes issuing or transmitting any amount of power lasting over any amount of time from active device 100 to passive object 250.

In one embodiment, this use of RFID/NFC power is capable of activating one or more I/O elements 253 at passive object 250, where these I/O elements 253 may include one or more of audio components, LED, motion components, etc., to further enhance the audio and/or visual tracking of passive object 250. For example, upon scanning passive object 250 as facilitated by scanning and powering logic 205 and scanners 243, scanning and powering logic 205 may trigger an LED light or a speaker of I/O elements 253 to momentarily or continuously flash a light or play a sound so that passive object 250 may be identified and tracked or monitored for as long as desired or necessitated.

Further, as previously mentioned, the scan of passive object 250 may also allow scanning and powering logic 205 to trigger smart tags 251 to provide or report to powering/tracking mechanism 110 any information pertinent to passive object 250, such as a unique ID to identify/verify passive object 250, a signal to a camera of sensor array 241 that passive object 250 is present, etc., to allow powering/ tracking mechanism 110 to lower its detection threshold (such as during occlusion or light changes, etc.) for identification purposes, AR usages, etc.

Similarly, in one embodiment, scanners 243, as facilitated by scanning and powering logic 205, may power one or more components of I/O elements 253, such as accelerometer, sound output, LED, etc., to allow for motion data to be reported back to active device 100 so that active device 100 may correlate visual movement with, for example, accelerometer events at passive object 250 using smart tags 251. This, for example, contributes in identifying the correct object, such as passive object 250, and determining whether passive object 250 is within the visual field of the camera of sensory array 241 of active device 100. For example, a mote, such as passive object 250, may allow for RFID and NFC fields to power sensors, e-ink displays, etc.

In one embodiment, active device 100 may be in communication with database(s) 225 having any amount and type of information, such as data, metadata, etc., relating to any number and type of applications, such as what AR effects correlate to passive object 250 to allow for updated AR effects to be presented as facilitated by AR rendering logic 209. Further, in one embodiment, database(s) 225 may also include information about expected visual or audio characteristics of passive object 250 to allow for better tracking (by sensors such as cameras, microphones, capacitance components, and other proximity detection components of sensory array 241) as facilitated by coordination and tracking logic 207. For example, coordination and tracking logic 207 at active device 100 being aware of the appearance of passive object 250 may allow for a quicker high-confidence identification of passive object 250.

In one embodiment, while coordination and tracking logic 207 may be used for tracking or monitoring of passive object 250, response and application logic 211 may be used for communication with server computer 270 and other computing devices, databases, etc., for reporting purposes where information be received from or sent to one or more entities, such as from server computer 270, database(s) 225, one or more printers, display screens, etc. Further coordination and tracking logic 207 may be used to receive any information directly from passive object 250, while any additional information, such as responses, from various entities, such as server computer 270, database(s) 225, etc., may be received by response and application logic 211.

Further, response and application logic 211 may be used to apply the tracking information, identification information, and any additional information pertaining to passive object 250 for various application usages (e.g., monitoring, tracking, sharing, advertising, virtual tagging, broadcasting, visual analysis, etc.) that are other than rendering AR usages facilitated by AR rendering logic 209. For example, response and application logic 211 may be used to prompt or access one or more database(s) 225 to receive one or more responses when additional information about passive object 250 may be needed, such as simply adding information to the data already obtained through coordination and tracking logic 207.

In one embodiment, server computer 270 (e.g., cloud-based server computer) may be communicatively coupled with active device 100 to provide and process additional information, such as added data, metadata, historical data, track record, user information, shape or size, physical appearance, model or registration number, etc., relating to passive object 250. For example, server computer 270 may have access to database(s) 225 and/or other databases, repositories, data sources, etc., to access and maintain additional information relating to passive object 250. For example, when additional information is needed, it request may be sent from active device 100 to server computer 270 over communication medium 230, as facilitated by communication/compatibility logic 215 and communication engine 275, where this request is then processed by processing engine 271, such as accessing and extracting the relevant additional information from one or more repositories, such as database(s) 225. In one embodiment, processing engine 271 may then provide this information to reporting engine 273 to generate a report/response based on the relevant additional information, where the response is then communicated back to active device 100 via one or more components, such as response and application logic 211. As aforementioned, a response may simply include added information to help with tracking, monitoring, verifying, etc., such as added visual information (e.g., specific features, color, shape, size, physical location, etc.) relating to passive object 250.

Further, in one embodiment, database(s) 225 may include or be referred to as a database of desired responses such that various IDs and sensor data, including any expected or predictive visual and audio characteristics of passive object 250, may be derived from the data at database(s) 225 in addition to or as an alternative to what may be obtained by active device 100 and/or offered by passive object 250. It is contemplated and to be noted that database(s) 225 may be hosted by the actual device, such as active device 100, or placed within proximity of active device 100 in communication over communication medium 230, such as a proximity network (e.g., Bluetooth, etc.), or remotely in communication with active device 100 over communication medium 230, such as a cloud network, the Internet, etc. It is further embodiment that embodiments are not limited to any particular architectural placement or system setup with regard to database(s) 225 or any other logic, components, devices, objects, networks, etc., discussed throughout this document.

Referring back to database(s) 225 being the database of desired responses, following are one or more scenarios or examples of object data and/or derived information from database(s) 225 that are pertinent to passive object 250 along with their corresponding responses: 1) ID of passive object 250 being the object data/derived information, then the response may include having any corresponding AR being presented in a video recording of passive object 250 (such as a video recording is initiated with the RFID is presented by passive object through smart tags 251 and any AR is then added to the video recording); 2) object colors along with the ID of passive object 250, the response may include adding colors to passive object 250 for coordination and tracking logic 207 to better enable tracking or enhance the quality of tracking of passive object 250 with the given ID; 3) specific user gesture relating to passive object 250 (such as the user having access to passive object 250 shaking or moving passive object 250 or altering its path, etc.), then the response may include adding a corresponding sound effect to the video recording of passive object 250; and 4) audio from passive object 250 is detected along with the ID relating to passive object 250, then the response may include using one or more microphones from a microphone array of sensor array 241 of active device 100, adding positioning data to assist coordination and tracking logic 207 to perform better tracking of passive object 250.

Further, in one embodiment, powering/tracking mechanism 110 may further include context logic 213 for detecting physical location, activities, trends, behavior history, etc., to, for example, alter the current behavior to a chosen or desired behavior of passive object 250. For example, a change in behavior of passive object 250 may include moving, turning, playing sound, jumping, stopping, etc., of passive object 250, as desired or necessary. For example, context logic 213 may work with one or more sensors (e.g., environmental sensors, etc.) of sensor array 241 to obtain data that comes from sources other than passive object 250.

It is contemplated that the number and type of active device 100, passive object 250, server computer 270, database(s) 225, communication medium 230, and any of the components may vary and are not limited in anyway. For example, scanners 243 may include a single scanner (e.g., RFID scanner) to scan a single object, such as passive object 250, or multiple scanners (e.g., multiple RFID scanners, NFC scanners, etc.) to allow for simultaneous scanning of multiple passive objects. Further, it is contemplated and to be noted that scanners 243 are not merely limited to RFID scanners or NFC scanners but that other alternative scanners or wireless powering techniques/components may be used to charge a capacitor that may then charge another low-power radio (e.g., Wi-Fi) in passive object 250. The number and type of scanners 243 may depend on the number, type, and resources of active device 100 and/or passive object 250.

Similarly, embodiments are not limited to any particular number or type of sensors 241, such as object detection, identification, tracking, etc., may be performed using any one or more of cameras (such as 2D cameras, 3D cameras, etc.), microphone array (such as ultrasound microphones), capacitance components, radio-filed disruption components, etc. For example, microphone/radar, capacitance, and radio tracking, etc., may be cruder than camera-based tracking; however, in some embodiments, such tracking may be used as an alternative choice or in addition to visual tracking.

Now referring to passive object 250, like active device 100, embodiments are not limited to any particular number or type of components for performance of one or more tasks as set forth in this document. For example, smart tags 251 may include any number and type of passive wireless communication tags (also referred to as "chips"), such as an RFID tag, an NFC tag, or any other number or type of passive wireless communication chips.

Further, for example, I/O elements 253 of passive object 250 may include any number and type of wireless-powered motion sensors, sound components, LEDs, etc., that are powered upon powering up through, for example, scanning of smart tags 251 by one or more scanners 243. In some embodiments, passive object 250 may include a capacitor that first charges from scanning by one or more scanners 243 (e.g., RFID scanner, NFC scanner, etc.) to then allow for a stable delivery of power to passive object 250. Further, any RFID code may be one or more codes, either simultaneously or in sequence, such as, in one embodiment, the standard code may be partly devoted to the passcode and party devoted to motion sensor data or, in another embodiment, the ID associated with passive object 250 may be read or detected before a user makes a gesture to change the code. In yet another embodiment, passive object 250 may host one RFID with two codes or 2 RFIDs with each having a single code, such as 1 ID and 1 passcode, etc., that capable of being updated by gesture inputs.

Active device 100 may include I/O source(s) 108 having capturing/sensing components 231 and output components 233, where, for example, capturing/sensing components 231 may include (without limitation) 2D cameras, 3D cameras, depth-sensing cameras (e.g., Intel® RealSense™ camera, etc.), sensor array, microphone array, etc., while, output components 233 may include (without limitation) display screens, display/projection areas, projectors, speakers, etc.

Active device 100 may be further in communication with one or more repositories or data sources or databases, such as database(s) 225, to obtain, communicate, store, and maintain any amount and type of data (e.g., user and/or device preferences, user and/or device profiles, authentication/verification data, other data and/or metadata relating to users and/or passive objects, such as passive object 250, recommendations, predictions, data tables, data maps, media, metadata, templates, real-time data, historical contents, user and/or device identification tags and other information, resources, policies, criteria, rules, regulations, upgrades, etc.).

In some embodiments, communication medium 230 may include any number and type of communication channels or networks, such as cloud network, the Internet, intranet, Internet of Things ("IoT"), proximity network, such as Bluetooth, RFID, NFC, Body Area Network (BAN), etc. It is contemplated that embodiments are not limited to any particular number or type of computing devices, services or resources, databases, networks, etc.

Capturing/sensing components 231 may further include one or more of vibration components, tactile components, conductance elements, biometric sensors, chemical detectors, signal detectors, electroencephalography, functional near-infrared spectroscopy, wave detectors, force sensors (e.g., accelerometers), illuminators, eye-tracking or gaze-tracking system, head-tracking system, etc., that may be used for capturing any amount and type of visual data, such as images (e.g., photos, videos, movies, audio/video streams, etc.), and non-visual data, such as audio streams or signals (e.g., sound, noise, vibration, ultrasound, etc.), radio waves (e.g., wireless signals, such as wireless signals having data, metadata, signs, etc.), chemical changes or properties (e.g., humidity, body temperature, etc.), biometric readings (e.g., figure prints, etc.), brainwaves, brain circulation, environmental/weather conditions, maps, etc. It is contemplated that "sensor" and "detector" may be referenced interchangeably throughout this document. It is further contemplated that one or more capturing/sensing components 231 may further include one or more of supporting or supplemental devices for capturing and/or sensing of data, such as illuminators (e.g., IR illuminator), light fixtures, generators, sound blockers, etc.

It is further contemplated that in one embodiment, capturing/sensing components 231 may further include any number and type of context sensors (e.g., linear accelerometer) for sensing or detecting any number and type of contexts (e.g., estimating horizon, linear acceleration, etc., relating to a mobile computing device, etc.). For example, capturing/sensing components 231 may include any number and type of sensors, such as (without limitations): accelerometers (e.g., linear accelerometer to measure linear acceleration, etc.); inertial devices (e.g., inertial accelerometers, inertial gyroscopes, micro-electro-mechanical systems (MEMS) gyroscopes, inertial navigators, etc.); and gravity gradiometers to study and measure variations in gravitation acceleration due to gravity, etc.

Further, for example, capturing/sensing components 231 may include (without limitations): audio/visual devices (e.g., cameras, microphones, speakers, etc.); context-aware sensors (e.g., temperature sensors, facial expression and feature measurement sensors working with one or more cameras of audio/visual devices, environment sensors (such as to sense background colors, lights, etc.); biometric sensors (such as to detect fingerprints, etc.), calendar maintenance and reading device), etc.; global positioning system (GPS) sensors; resource requestor; and trusted execution environment (TEE) logic. TEE logic may be employed separately or be part of resource requestor and/or an I/O subsystem, etc. Capturing/sensing components 231 may further include voice recognition devices, photo recognition devices, facial and other body recognition components, voice-to-text conversion components, etc.

Similarly, output components 233 may include dynamic tactile touch screens having tactile effectors as an example of presenting visualization of touch, where an embodiment of such may be ultrasonic generators that can send signals in space which, when reaching, for example, human fingers can cause tactile sensation or like feeling on the fingers. Further, for example and in one embodiment, output components 233 may include (without limitation) one or more of light sources, display devices and/or screens, audio speakers, tactile components, conductance elements, bone conducting speakers, olfactory or smell visual and/or non/visual presentation devices, haptic or touch visual and/or non-visual presentation devices, animation display devices, biometric display devices, X-ray display devices, high-resolution displays, high-dynamic range displays, multi-view displays, and head-mounted displays (HMDs) for at least one of virtual reality (VR) and augmented reality (AR), etc.

Figure 3A:
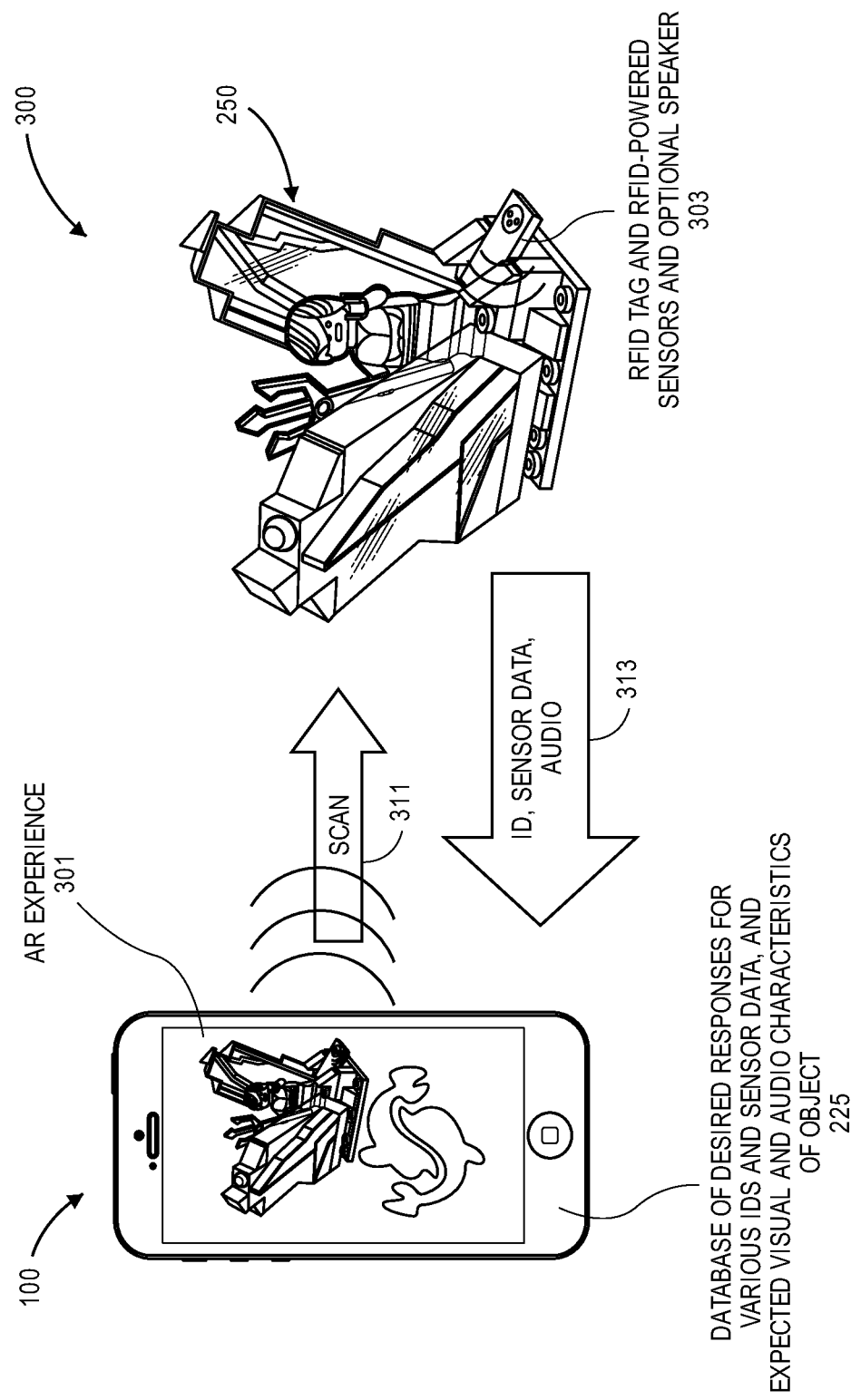
FIG. 3A illustrates a use case scenario according to one embodiment

It is contemplated that embodiment are not limited to any particular number or type of use case scenarios; however, one or more use-case scenarios, such as those shown with respect to FIGS. 3A-3B, are throughout this document for the sake of brevity, clarity, and ease of understanding but it is to be noted that embodiments are not limited as such. Further, throughout this document, "user" may refer to someone having access to one or more devices and/or objects (e.g., active device 100, passive object 250, etc.) and may be referenced interchangeably with "person", "individual", "human", "him", "her", "child", "adult", "player", "gamer", "developer", programmer", and/or the like.

Communication/compatibility logic 217 may be used to facilitate dynamic communication and compatibility between various powered devices and unpowered objects, such as active device 100, passive object 250, server computer 100, database(s) 225, communication medium 230, etc., and any number and type of other computing devices (such as wearable computing devices, mobile computing devices, desktop computers, server computing devices, etc.), processing devices (e.g., central processing unit (CPU), graphics processing unit (GPU), etc.), capturing/sensing components (e.g., non-visual data sensors/detectors, such as audio sensors, olfactory sensors, haptic sensors, signal sensors, vibration sensors, chemicals detectors, radio wave detectors, force sensors, weather/temperature sensors, body/biometric sensors, scanners, etc., and visual data sensors/detectors, such as cameras, etc.), user/context-awareness components and/or identification/verification sensors/devices (such as biometric sensors/detectors, scanners, etc.), memory or storage devices, data sources, and/or database(s) (such as data storage devices, hard drives, solid-state drives, hard disks, memory cards or devices, memory circuits, etc.), network(s) (e.g., Cloud network, Internet, Internet of Things, intranet, cellular network, proximity networks, such as Bluetooth, Bluetooth low energy (BLE), Bluetooth Smart, Wi-Fi proximity, Radio Frequency Identification, Near Field Communication, Body Area Network, etc.), wireless or wired communications and relevant protocols (e.g., Wi-Fi®, WiMAX, Ethernet, etc.), connectivity and location management techniques, software applications/websites, (e.g., social and/or business networking websites, business applications, games and other entertainment applications, etc.), programming languages, etc., while ensuring compatibility with changing technologies, parameters, protocols, standards, etc.

Throughout this document, terms like "logic", "component", "module", "framework", "engine", "tool", and the like, may be referenced interchangeably and include, by way of example, software, hardware, and/or any combination of software and hardware, such as firmware. In one example, "logic" may refer to or include a software component that is capable of working with one or more of an operating system, a graphics driver, etc., of a computing device, such as active device 100. In another example, "logic" may refer to or include a hardware component that is capable of being physically installed along with or as part of one or more system hardware elements, such as an application processor, a graphics processor, etc., of a computing device, such as active device 100. In yet another embodiment, "logic" may refer to or include a firmware component that is capable of being part of system firmware, such as firmware of an application processor or a graphics processor, etc., of a computing device, such as active device 100.

Further, any use of a particular brand, word, term, phrase, name, and/or acronym, such as "powered", "unpowered", "tracking", "detecting", "augmented reality", "AR", "database of responses", "RFID", "NFC", "sensor", "tag", "chip", "video", "audio", LED", "sensor array", "camera", "microphone array", "accelerometer", "toy", "object", "device", "identification", "ID", "secured", "privacy", "user", "user profile", "user preference", "user", "sender", "receiver", "personal device", "smart device", "mobile computer", "wearable device", "IoT device", "proximity network", "cloud network", "server computer", etc., should not be read to limit embodiments to software or devices that carry that label in products or in literature external to this document.

It is contemplated that any number and type of components may be added to and/or removed from powering/tracking mechanism 110 to facilitate various embodiments including adding, removing, and/or enhancing certain features. For brevity, clarity, and ease of understanding of powering/tracking mechanism 110, many of the standard and/or known components, such as those of a computing device, are not shown or discussed here. It is contemplated that embodiments, as described herein, are not limited to any particular technology, topology, system, architecture, and/or standard and are dynamic enough to adopt and adapt to any future changes.

Figure 2B:
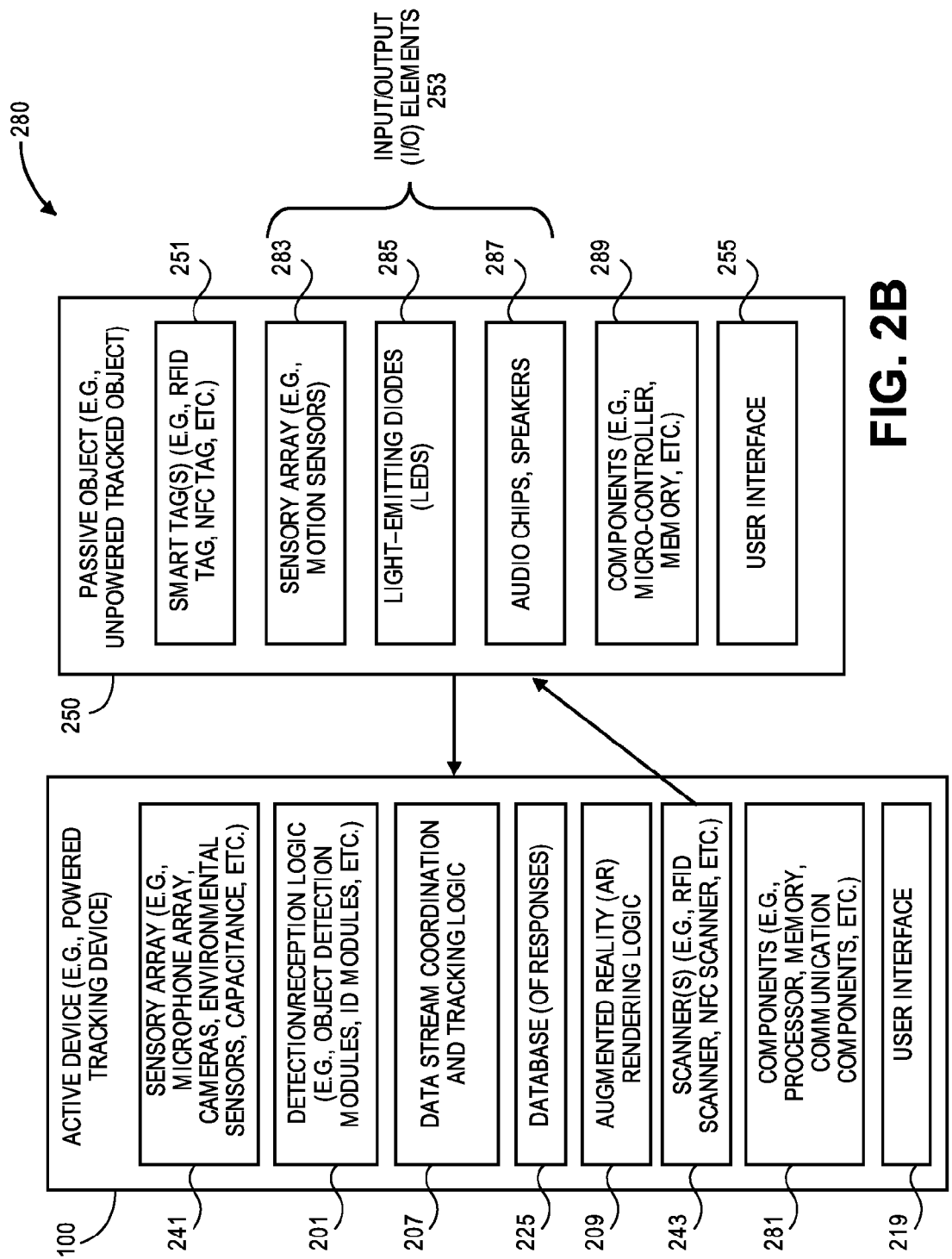
FIG. 2B illustrates an architectural placement according to one embodiment.

FIG. 2B illustrates an architectural placement 280 according to one embodiment. As an initial matter, for brevity, many of the details discussed with reference to the previous FIGS. 1-2A may not be discussed or repeated hereafter. Further, it is contemplated and to be noted that embodiments are not limited to any particular architectural placement, such as architectural placement 280.

As illustrated, in one embodiment, active device 100 and passive object 250 are shown in communication with each other and including various components as described earlier with reference to FIG. 2A. For example, as illustrated, active device 100 is shown to include (without limitation): sensor array 241 (e.g., microphones, cameras, capacitance, etc.); detection/reception logic 201 (e.g., object detection modules, ID modules, etc.); coordination and tracking logic 207; database (of responses) 225; AR rendering logic 209; scanners 243 (e.g., RFID scanner, NFC scanner, etc.); user interface 219; and other components 281, such as processor(s) 102 and memory 104 of FIG. 1 and communication/compatibility logic 217 of FIG. 2A.

Active device 100 is shown to be in communication with passive object 250, where passive object 250 (e.g., toys, games, household items, office items, motes, sensor nodes, etc.) may include (without limitation): smart tags 251 (e.g., RFID tag, NFC tag, etc.); sensory array (e.g., motion sensors) 283, LEDs 285, Audio components and speakers 287 that are collectively referred to as I/0 elements 253; user interface 255; and other components 289, such as microcontroller, memory, etc.

FIG. 3A illustrates a use case scenario 300 according to one embodiment. As an initial matter, for brevity, many of the details discussed with reference to the previous FIGS. 1-2B may not be discussed or repeated hereafter. Further, it is contemplated and to be noted that embodiments are not limited to any particular use case scenario, such as use case scenario 300.

In the illustrated embodiment, active device 100 is a mobile computer, such as a smartphone, while passive object 250 is a child's toy. As illustrated, transaction sequence 311, 313, as facilitated by powering/tracking mechanism 110 of FIG. 1, is shown to occur between active device 100 and passive object 250, where passive object 250 is scanned, at process 311, by one or more scanners, such as scanners 243, and/or one or more sensors (e.g., cameras) of sensory array 241 of FIG. 2A, of active device 100 to which, passive object 250 responds by sending, at process 313, any amount and type of data, such as ID, sensor data, audio, etc., to active device 100 as facilitated by one or more components 303 including smart tags 251 (e.g., RFID tag, NFC tag, etc.) and/or RFID-powered sensors, optional speakers, etc., of I/0 elements 253 of FIG. 2A.

In one embodiment, upon receiving the relevant data from passive object 250, this data may then be had at active device 100 as part of database 225 of desired responses of various IDs and sensor data, and expected visual and audio characteristics of passive object 250, where this data may then be used or applied with an AR-based application to obtain or render one or more AR experiences, such as AR experience 301, as facilitated by AR rendering logic 209 of FIG. 2A. For example, in the illustrated embodiment, AR experience 301 shows passive object 250 being submerged in water having fish.

FIGS. 3B and 3C illustrates a use case scenarios 340, 360 according to one embodiment. As an initial matter, for brevity, many of the details discussed with reference to the previous FIGS. 1-3A may not be discussed or repeated hereafter. Further, it is contemplated and to be noted that embodiments are not limited to any particular use case scenario, such as use case scenario 340, 360.

In the illustrated use case scenario 340, four passive objects 350A, 350B, 350C, 350D, being toy race cars, are shown as about to race on a race track, such as surface 360, where, in this case, in one embodiment, various scanners 243 (e.g., RFID scanner, NFC scanner, etc.) may be installed or placed under each race track of surface 360 so passive objects 350A-350D are detected and tracked as they race on surface 360. For example, in the illustrated embodiment, each passive object 350A-350D may be identified and tracked using scanners 243, such as which passive object 350A-350D is for which track of surface 360 for tracking for AR additions to a video stream, such as using one or more cameras 380 of FIG. 3C.

Referring now to FIG. 3C, the illustrated use case scenario 370 is an extension of use case scenario 340 of FIG. 3B. In the illustrated embodiment of use case scenario 370, surface 360 is shown in its entirety and as having employed additional one or more tracking devices, such as one or more cameras 380 of sensor array 241, to capture a video stream or an audio/video stream of passive objects 350A, 350B, 350C, 350D coming down their tracks on surface 360. In this embodiment, each passive object 350A-350D may be identified and tracked to allow for the right visual and sound effects to be applied to the AR results.

Figure 4:
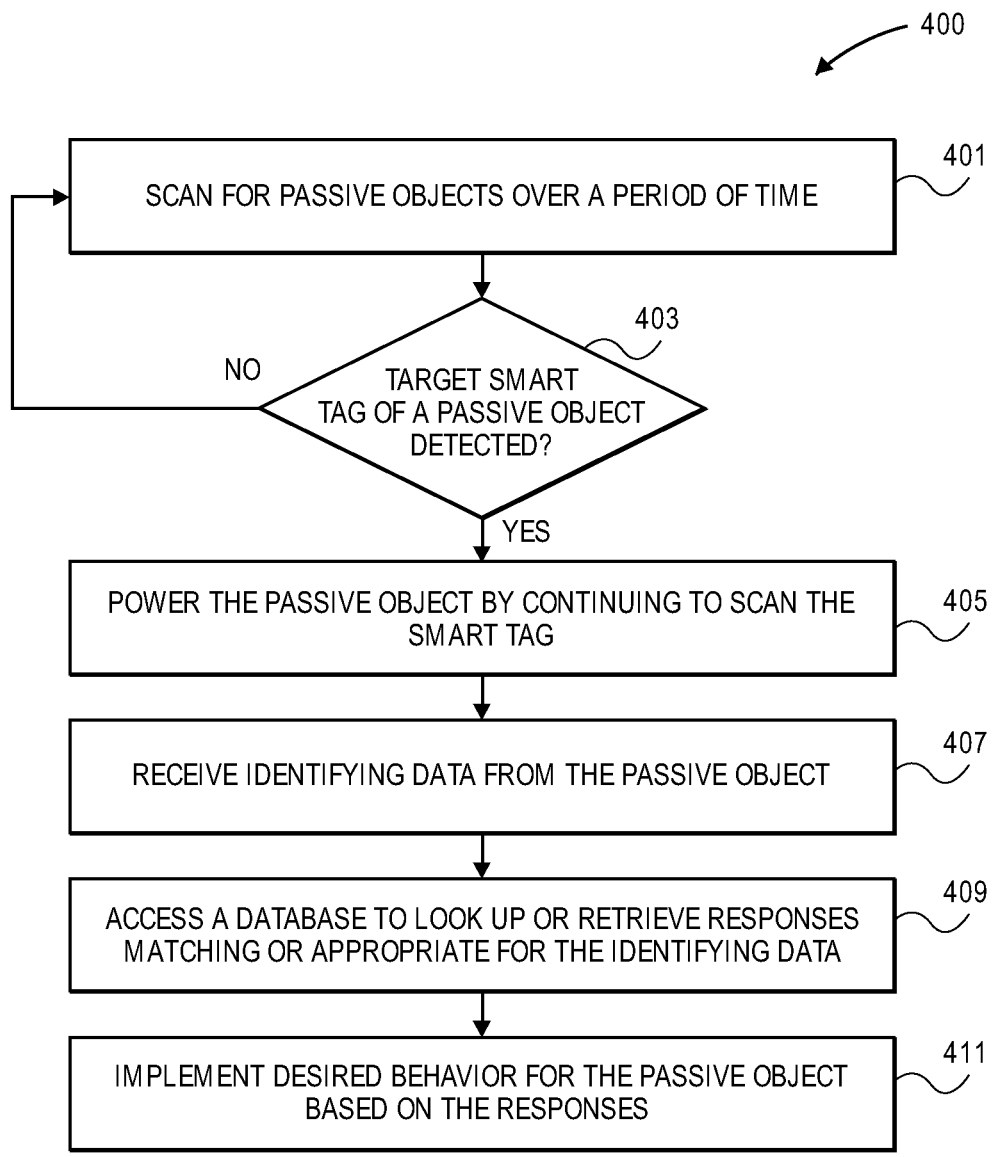
FIG. 4 illustrates a method for facilitating wireless powering and tracking of passive objects according to one embodiment.

FIG. 4 illustrates a method 400 for facilitating wireless powering and tracking of passive objects according to one embodiment. Method 400 may be performed by processing logic that may comprise hardware (e.g., circuitry, dedicated logic, programmable logic, etc.), software (such as instructions run on a processing device), or a combination thereof, as facilitated by powering/tracking mechanism 110 of FIG. 1. The processes of method 400 are illustrated in linear sequences for brevity and clarity in presentation; however, it is contemplated that any number of them can be performed in parallel, asynchronously, or in different orders. For brevity, many of the details discussed with reference to the previous FIGS. 1-3C may not be discussed or repeated hereafter.

Method 400 begins at block 401 with scanning of a passive object (e.g., toys, games, household items, office items, personal items, motes, etc.) by a scanner (e.g., RFID scanner, NFC scanner, etc.) hosted by an active device (e.g., smartphone, tablet computer, laptop computer, wearable smart device, etc.) over airwaves. At block 403, a determination is made to whether a target smart tag (e.g., RFID tag, NFC tag, etc.) hosted by the passive object is detected by the scanner at the active device. If no target tag is detected, the processing of scanning may continue on a predetermined basis, such as on-demand or automatically over a period of time, etc. If the target smart tag at the passive object is detected, at block 405, in one embodiment, the scanning by the scanner is continued to power the passive object using its smart tag.

Moreover, in one embodiment, at block 407, the passive object sends a data output back to the active device, where this data output is initiated from the scan performed by the active device. It is contemplated and to be noted that this data output is distinct from identification (e.g., unique ID) typically associated with a tag (e.g., RFID tag) in that this output may further include visual output and/or audio output initiated from the scan to allow the active device to match the physical object in a database to receive additional information about the visual and/or audio characteristics of the physical object to enable detection of the location of the physical object and subsequently, facilitate an AR experience involving the physical object.

At block 409, the active device accepts the data output and looks up by accessing the database for responses to determine an appropriate response matching the data output (such as for AR usages, etc.). At block 411, in one embodiment, once the appropriate or desired response is detected or found at the database, the response is then implemented to trigger a desired behavior (such as facilitating the passive object to play loud sounds, flash light, move or redirect, stop, etc., for generating and offering AR usages involving the passive object, etc.).

Figure 5:
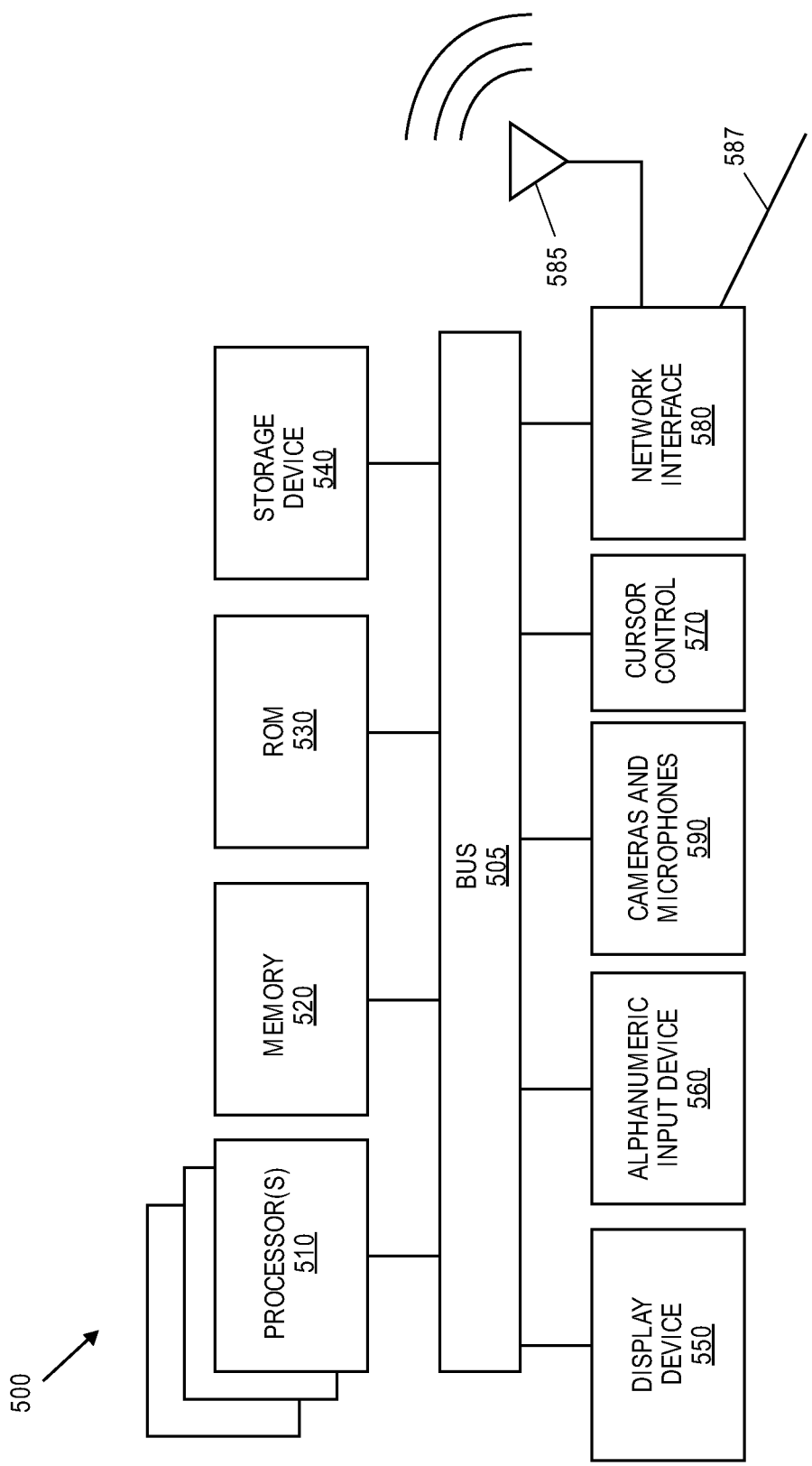
FIG. 5 illustrates computer environment suitable for implementing embodiments of the present disclosure according to one embodiment.

FIG. 5 illustrates an embodiment of a computing system 500 capable of supporting the operations discussed above. Computing system 500 represents a range of computing and electronic devices (wired or wireless) including, for example, desktop computing systems, laptop computing systems, cellular telephones, personal digital assistants (PDAs) including cellular-enabled PDAs, set top boxes, smartphones, tablets, wearable devices, etc. Alternate computing systems may include more, fewer and/or different components. Computing device 500 may be the same as or similar to or include computing devices 100 described in reference to FIG. 1.

Computing system 500 includes bus 505 (or, for example, a link, an interconnect, or another type of communication device or interface to communicate information) and processor 510 coupled to bus 505 that may process information. While computing system 500 is illustrated with a single processor, it may include multiple processors and/or co-processors, such as one or more of central processors, image signal processors, graphics processors, and vision processors, etc. Computing system 500 may further include random access memory (RAM) or other dynamic storage device 520 (referred to as main memory), coupled to bus 505 and may store information and instructions that may be executed by processor 510. Main memory 520 may also be used to store temporary variables or other intermediate information during execution of instructions by processor 510.

Computing system 500 may also include read only memory (ROM) and/or other storage device 530 coupled to bus 505 that may store static information and instructions for processor 510. Date storage device 540 may be coupled to bus 505 to store information and instructions. Date storage device 540, such as magnetic disk or optical disc and corresponding drive may be coupled to computing system 500.

Computing system 500 may also be coupled via bus 505 to display device 550, such as a cathode ray tube (CRT), liquid crystal display (LCD) or Organic Light Emitting Diode (OLED) array, to display information to a user. User input device 560, including alphanumeric and other keys, may be coupled to bus 505 to communicate information and command selections to processor 510. Another type of user input device 560 is cursor control 570, such as a mouse, a trackball, a touchscreen, a touchpad, or cursor direction keys to communicate direction information and command selections to processor 510 and to control cursor movement on display 550. Camera and microphone arrays 590 of computer system 500 may be coupled to bus 505 to observe gestures, record audio and video and to receive and transmit visual and audio commands.

Computing system 500 may further include network interface(s) 580 to provide access to a network, such as a local area network (LAN), a wide area network (WAN), a metropolitan area network (MAN), a personal area network (PAN), Bluetooth, a cloud network, a mobile network (e.g., 3$^{rd}$ Generation (3G), etc.), an intranet, the Internet, etc. Network interface(s) 580 may include, for example, a wireless network interface having antenna 585, which may represent one or more antenna(e). Network interface(s) 580 may also include, for example, a wired network interface to communicate with remote devices via network cable 587, which may be, for example, an Ethernet cable, a coaxial cable, a fiber optic cable, a serial cable, or a parallel cable.

Network interface(s) 580 may provide access to a LAN, for example, by conforming to IEEE 802.11b and/or IEEE 802.11g standards, and/or the wireless network interface may provide access to a personal area network, for example, by conforming to Bluetooth standards. Other wireless network interfaces and/or protocols, including previous and subsequent versions of the standards, may also be supported.

In addition to, or instead of, communication via the wireless LAN, network interface(s) 580 may provide wireless communication using, for example, Time Division, Multiple Access (TDMA) protocols, Global Systems for Mobile Communications (GSM) protocols, Code Division, Multiple Access (CDMA) protocols, and/or any other type of wireless communications protocols.

Network interface(s) 580 may include one or more communication interfaces, such as a modem, a network interface card, or other well-known interface devices, such as those used for coupling to the Ethernet, token ring, or other types of physical wired or wireless attachments for purposes of providing a communication link to support a LAN or a WAN, for example. In this manner, the computer system may also be coupled to a number of peripheral devices, clients, control surfaces, consoles, or servers via a conventional network infrastructure, including an Intranet or the Internet, for example.

It is to be appreciated that a lesser or more equipped system than the example described above may be preferred for certain implementations. Therefore, the configuration of computing system 500 may vary from implementation to implementation depending upon numerous factors, such as price constraints, performance requirements, technological improvements, or other circumstances. Examples of the electronic device or computer system 500 may include without limitation a mobile device, a personal digital assistant, a mobile computing device, a smartphone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combinations thereof.

Embodiments may be implemented as any or a combination of: one or more microchips or integrated circuits interconnected using a parentboard, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments may be provided, for example, as a computer program product which may include one or more transitory or non-transitory machine-readable storage media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

References to "one embodiment", "an embodiment", "example embodiment", "various embodiments", etc., indicate that the embodiment(s) so described may include particular features, structures, or characteristics, but not every embodiment necessarily includes the particular features, structures, or characteristics. Further, some embodiments may have some, all, or none of the features described for other embodiments.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

Figure 6:
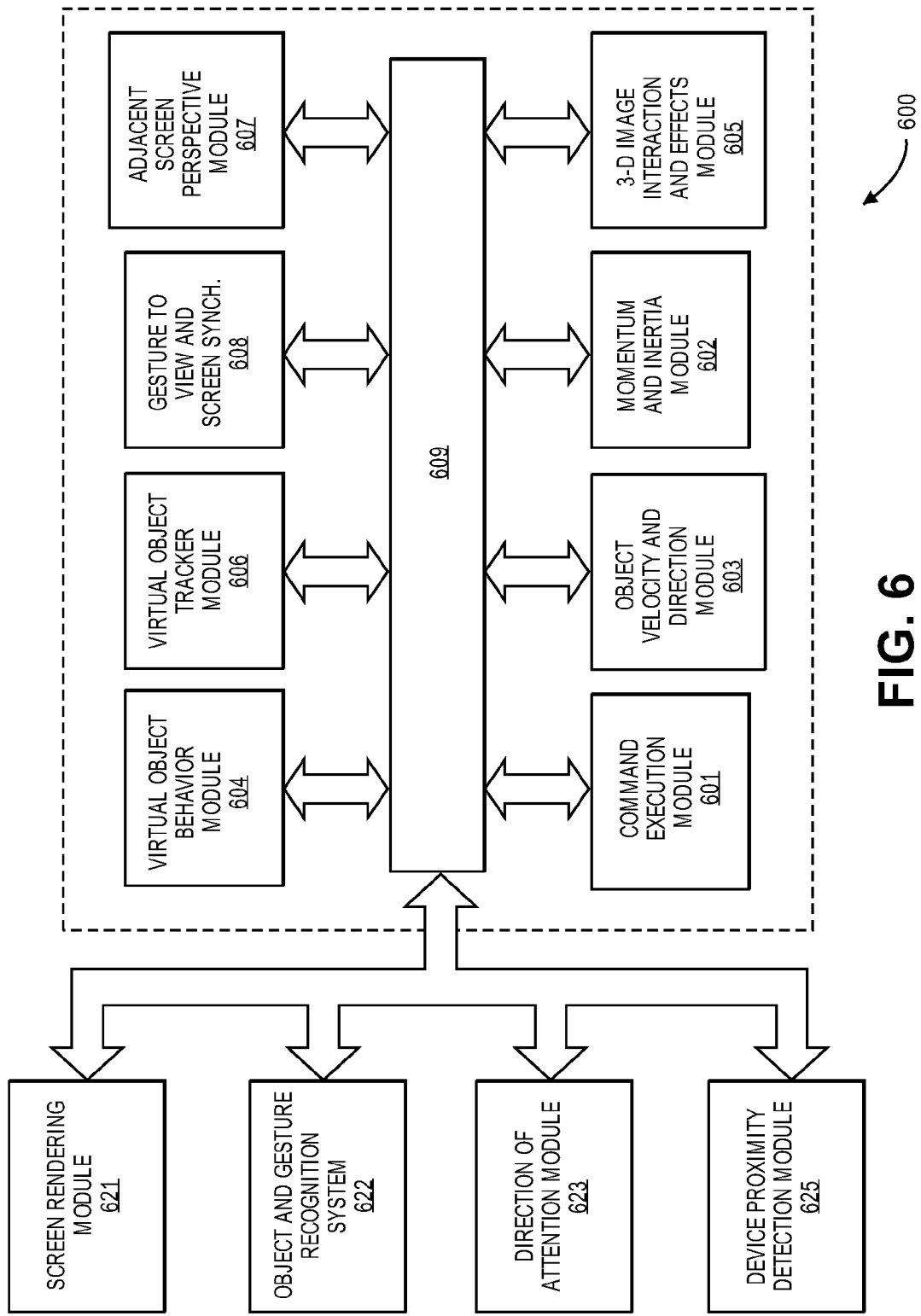
FIG. 6 illustrates a method for facilitating dynamic targeting of users and communicating of message according to one embodiment.

FIG. 6 illustrates an embodiment of a computing environment 600 capable of supporting the operations discussed above. The modules and systems can be implemented in a variety of different hardware architectures and form factors including that shown in FIG. 4.

The Command Execution Module 601 includes a central processing unit to cache and execute commands and to distribute tasks among the other modules and systems shown. It may include an instruction stack, a cache memory to store intermediate and final results, and mass memory to store applications and operating systems. The Command Execution Module may also serve as a central coordination and task allocation unit for the system.

The Screen Rendering Module 621 draws objects on the one or more multiple screens for the user to see. It can be adapted to receive the data from the Virtual Object Behavior Module 604, described below, and to render the virtual object and any other objects and forces on the appropriate screen or screens. Thus, the data from the Virtual Object Behavior Module would determine the position and dynamics of the virtual object and associated gestures, forces and objects, for example, and the Screen Rendering Module would depict the virtual object and associated objects and environment on a screen, accordingly. The Screen Rendering Module could further be adapted to receive data from the Adjacent Screen Perspective Module 607, described below, to either depict a target landing area for the virtual object if the virtual object could be moved to the display of the device with which the Adjacent Screen Perspective Module is associated. Thus, for example, if the virtual object is being moved from a main screen to an auxiliary screen, the Adjacent Screen Perspective Module 2 could send data to the Screen Rendering Module to suggest, for example in shadow form, one or more target landing areas for the virtual object on that track to a user's hand movements or eye movements.

The Object and Gesture Recognition System 622 may be adapted to recognize and track hand and arm gestures of a user. Such a module may be used to recognize hands, fingers, finger gestures, hand movements and a location of hands relative to displays. For example, the Object and Gesture Recognition Module could for example determine that a user made a body part gesture to drop or throw a virtual object onto one or the other of the multiple screens, or that the user made a body part gesture to move the virtual object to a bezel of one or the other of the multiple screens. The Object and Gesture Recognition System may be coupled to a camera or camera array, a microphone or microphone array, a touch screen or touch surface, or a pointing device, or some combination of these items, to detect gestures and commands from the user.

The touch screen or touch surface of the Object and Gesture Recognition System may include a touch screen sensor. Data from the sensor may be fed to hardware, software, firmware or a combination of the same to map the touch gesture of a user's hand on the screen or surface to a corresponding dynamic behavior of a virtual object. The sensor data may be used to momentum and inertia factors to allow a variety of momentum behavior for a virtual object based on input from the user's hand, such as a swipe rate of a user's finger relative to the screen. Pinching gestures may be interpreted as a command to lift a virtual object from the display screen, or to begin generating a virtual binding associated with the virtual object or to zoom in or out on a display. Similar commands may be generated by the Object and Gesture Recognition System using one or more cameras without the benefit of a touch surface.

The Direction of Attention Module 623 may be equipped with cameras or other sensors to track the position or orientation of a user's face or hands. When a gesture or voice command is issued, the system can determine the appropriate screen for the gesture. In one example, a camera is mounted near each display to detect whether the user is facing that display. If so, then the direction of attention module information is provided to the Object and Gesture Recognition Module 622 to ensure that the gestures or commands are associated with the appropriate library for the active display. Similarly, if the user is looking away from all of the screens, then commands can be ignored.

The Device Proximity Detection Module 625 can use proximity sensors, compasses, GPS (global positioning system) receivers, personal area network radios, and other types of sensors, together with triangulation and other techniques to determine the proximity of other devices. Once a nearby device is detected, it can be registered to the system and its type can be determined as an input device or a display device or both. For an input device, received data may then be applied to the Object Gesture and Recognition System 622. For a display device, it may be considered by the Adjacent Screen Perspective Module 607.

The Virtual Object Behavior Module 604 is adapted to receive input from the Object Velocity and Direction Module, and to apply such input to a virtual object being shown in the display. Thus, for example, the Object and Gesture Recognition System would interpret a user gesture and by mapping the captured movements of a user's hand to recognized movements, the Virtual Object Tracker Module would associate the virtual object's position and movements to the movements as recognized by Object and Gesture Recognition System, the Object and Velocity and Direction Module would capture the dynamics of the virtual object's movements, and the Virtual Object Behavior Module would receive the input from the Object and Velocity and Direction Module to generate data that would direct the movements of the virtual object to correspond to the input from the Object and Velocity and Direction Module.

The Virtual Object Tracker Module 606 on the other hand may be adapted to track where a virtual object should be located in three-dimensional space in a vicinity of a display, and which body part of the user is holding the virtual object, based on input from the Object and Gesture Recognition Module. The Virtual Object Tracker Module 606 may for example track a virtual object as it moves across and between screens and track which body part of the user is holding that virtual object. Tracking the body part that is holding the virtual object allows a continuous awareness of the body part's air movements, and thus an eventual awareness as to whether the virtual object has been released onto one or more screens.

The Gesture to View and Screen Synchronization Module 608, receives the selection of the view and screen or both from the Direction of Attention Module 623 and, in some cases, voice commands to determine which view is the active view and which screen is the active screen. It then causes the relevant gesture library to be loaded for the Object and Gesture Recognition System 622. Various views of an application on one or more screens can be associated with alternative gesture libraries or a set of gesture templates for a given view.

The Adjacent Screen Perspective Module 607, which may include or be coupled to the Device Proximity Detection Module 625, may be adapted to determine an angle and position of one display relative to another display. A projected display includes, for example, an image projected onto a wall or screen. The ability to detect a proximity of a nearby screen and a corresponding angle or orientation of a display projected therefrom may for example be accomplished with either an infrared emitter and receiver, or electromagnetic or photo-detection sensing capability. For technologies that allow projected displays with touch input, the incoming video can be analyzed to determine the position of a projected display and to correct for the distortion caused by displaying at an angle. An accelerometer, magnetometer, compass, or camera can be used to determine the angle at which a device is being held while infrared emitters and cameras could allow the orientation of the screen device to be determined in relation to the sensors on an adjacent device. The Adjacent Screen Perspective Module 607 may, in this way, determine coordinates of an adjacent screen relative to its own screen coordinates. Thus, the Adjacent Screen Perspective Module may determine which devices are in proximity to each other, and further potential targets for moving one or more virtual object's across screens. The Adjacent Screen Perspective Module may further allow the position of the screens to be correlated to a model of three-dimensional space representing all of the existing objects and virtual objects.

The Object and Velocity and Direction Module 603 may be adapted to estimate the dynamics of a virtual object being moved, such as its trajectory, velocity (whether linear or angular), momentum (whether linear or angular), etc. by receiving input from the Virtual Object Tracker Module. The Object and Velocity and Direction Module may further be adapted to estimate dynamics of any physics forces, by for example estimating the acceleration, deflection, degree of stretching of a virtual binding, etc. and the dynamic behavior of a virtual object once released by a user's body part. The Object and Velocity and Direction Module may also use image motion, size and angle changes to estimate the velocity of objects, such as the velocity of hands and fingers The Momentum and Inertia Module 602 can use image motion, image size, and angle changes of objects in the image plane or in a three-dimensional space to estimate the velocity and direction of objects in the space or on a display. The Momentum and Inertia Module is coupled to the Object and Gesture Recognition System 622 to estimate the velocity of gestures performed by hands, fingers, and other body parts and then to apply those estimates to determine momentum and velocities to virtual objects that are to be affected by the gesture.

The 3D Image Interaction and Effects Module 605 tracks user interaction with 3D images that appear to extend out of one or more screens. The influence of objects in the z-axis (towards and away from the plane of the screen) can be calculated together with the relative influence of these objects upon each other. For example, an object thrown by a user gesture can be influenced by 3D objects in the foreground before the virtual object arrives at the plane of the screen. These objects may change the direction or velocity of the projectile or destroy it entirely. The object can be rendered by the 3D Image Interaction and Effects Module in the foreground on one or more of the displays. As illustrated, various components, such as components 601, 602, 603, 604, 605. 606, 607, and 608 are connected via an interconnect or a bus, such as bus 609.

The following clauses and/or examples pertain to further embodiments or examples. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to performs acts of the method, or of an apparatus or system for facilitating hybrid communication according to embodiments and examples described herein.

Some embodiments pertain to Example 1 that includes an apparatus to facilitate powering of unpowered objects for tracking, augmented reality, and other experiences, comprising: a scanner to scan, via scanning and powering logic, an object, wherein the object includes an unpowered object, and wherein the scanner is further to detect, via detection/reception logic, a smart tag at the object; the scanning and powering logic to provide power to the object, wherein the power is provided via the smart tag at the object, wherein the scanning and powering logic is further to initiate an output from the object to enable data stream coordination and tracking logic to perform location tracking of the object, wherein the output is received by the detection/reception logic; and augmented reality (AR) logic to render an AR experience involving the object, wherein the AR experience is based on the output.

Example 2 includes the subject matter of Example 1, wherein the output comprises at least one of a video output or an audio output to allow response and application logic to access a database to match the object with contents at the database to retrieve supplemental information regarding video characteristics and audio characteristics, respectively, of the object to enable at least one of the location tracking or the AR experience, wherein the scanner includes a radio-frequency identification (RFID) scanner or a near-frequency communication (NFC) scanner.

Example 3 includes the subject matter of Example 1 or 2, wherein the output further comprises at least one of a vibration output, a motion output, and a light output, wherein the coordination and tracking logic is further to compare timings of the reception of the output at the apparatus and initiation, by the data stream coordination and tracking logic, of the output at the object.

Example 4 includes the subject matter of Example 2, wherein location tracking is further performed based on changes in and the timings of the output, wherein location tracking includes detecting one or more of movement, direction, deviation, stoppage, and sound relating to the object based on the output.

Example 5 includes the subject matter of Example 2 or 4, wherein location tracking is performed by one or more cameras, wherein the one or more cameras to capture one or more of images and video streams of the object.

Example 6 includes the subject matter of Example 1, wherein the response and application is further to determine one or more responses at the database matching the output, wherein the database maintains information relating to the object, wherein the one or more responses are obtained from the information at the database that is communicatively coupled to the apparatus.

Example 7 includes the subject matter of Example 1 or 6, wherein the AR logic is further to apply the one or more responses to render the AR experience, wherein the one or more responses represent one or more behaviors of the object being part of the AR experience, wherein the one or more responses include at least one of presenting the AR experience in a video recording of the object, adding colors to the object to enable tracking of the object using the output, adding sound to the video recording of the object, and adding position data to track the object.

Example 8 includes the subject matter of Example 1, further comprising context engine to detect, via a context sensor of a sensor array, location or activities of the object to determine one or more contexts relating to the object, wherein the context engine is further to alter, based on the one or more contexts, the one or more behaviors of the object, wherein the context sensor includes an environmental sensor.

Example 9 includes the subject matter of Example 1, further comprising: authentication logic to authenticate the object based on predetermined criteria including one or more of unique identification, registration, or passcode relating to the object, wherein authentication is performed via a user interface; and communication/compatibility logic to transmit the output to one or more computing devices over communication medium to process the output at the one or more computing devices, wherein processing includes accessing the supplemental information obtained from the database or determining the one or more responses, wherein the one or more computing devices include one or more server computers communicatively part of the communication medium including at least one of a proximity network, a cloud network, or the Internet.

Some embodiments pertain to Example 10 that includes a method for facilitating powering of unpowered objects for tracking, augmented reality, and other experiences, comprising: scanning, by a scanner of a computing device, an object, wherein the object includes an unpowered object, and wherein the scanner is further to detect a smart tag at the object; providing power, by the computing device, to the object, wherein the power is provided via the smart tag at the object, wherein providing power includes initiating an output from the object to enable performing of location tracking of the object, wherein the output is received by the computing device; and rendering an augmented reality (AR) experience involving the object, wherein the AR experience is based on the output.

Example 11 includes the subject matter of Example 10, wherein the output comprises at least one of a video output or an audio output to allow accessing of a database to match the object with contents at the database to retrieve supplemental information regarding video characteristics and audio characteristics, respectively, of the object to enable at least one of the location tracking or the AR experience, wherein the scanner includes a radio-frequency identification (RFID) scanner or a near-frequency communication (NFC) scanner.

Example 12 includes the subject matter of Example 10 or 11, wherein the output further comprises at least one of a vibration output, a motion output, and a light output, wherein location tracking includes comparing timings of the reception of the output at the computing device and initiation, by the computing device, of the output at the object.

Example 13 includes the subject matter of Example 11, wherein location tracking is further performed based on changes in and the timings of the output, wherein location tracking further includes detecting one or more of movement, direction, deviation, stoppage, and sound relating to the object based on the output.

Example 14 includes the subject matter of Example 11 or 13, wherein location tracking is performed by one or more cameras, wherein the one or more cameras to capture one or more of images and video streams of the object.

Example 15 includes the subject matter of Example 10, further comprising determining one or more responses at the database matching the output, wherein the database maintains information relating to the object, wherein the one or more responses are obtained from the information at the database that is communicatively coupled to the computing device.

Example 16 includes the subject matter of Example 10 or 15, wherein the AR experience is rendered based on the one or more responses, wherein the one or more responses represent one or more behaviors of the object being part of the AR experience, wherein the one or more responses include at least one of presenting the AR experience in a video recording of the object, adding colors to the object to enable tracking of the object using the output, adding sound to the video recording of the object, and adding position data to track the object.

Example 17 includes the subject matter of Example 10, further comprising detecting, by a context sensor of a sensor array hosted by the computing device, location or activities of the object to determine one or more contexts relating to the object, wherein the one or more contexts are used to alter the one or more behaviors of the object, wherein the context sensor includes an environmental sensor.

Example 18 includes the subject matter of Example 10, further comprising: authenticating the object based on predetermined criteria including one or more of unique identification, registration, or passcode relating to the object, wherein authentication is performed via a user interface; and transmitting the output to one or more computing devices over communication medium to process the output at the one or more computing devices, wherein processing includes accessing the supplemental information obtained from the database or determining the one or more responses, wherein the one or more computing devices include one or more server computers communicatively part of the communication medium including at least one of a proximity network, a cloud network, or the Internet.

Some embodiments pertain to Example 19 includes a system comprising a storage device having instructions, and a processor to execute the instructions to facilitate a mechanism to: scan, by a scanner of a computing device, an object, wherein the object includes an unpowered object, and wherein the scanner is further to detect a smart tag at the object; provide power, by the computing device, to the object, wherein the power is provided via the smart tag at the object, wherein providing power includes initiating an output from the object to enable performing of location tracking of the object, wherein the output is received by the computing device; and render an augmented reality (AR) experience involving the object, wherein the AR experience is based on the output.

Example 20 includes the subject matter of Example 19, wherein the output comprises at least one of a video output or an audio output to allow accessing of a database to match the object with contents at the database to retrieve supplemental information regarding video characteristics and audio characteristics, respectively, of the object to enable at least one of the location tracking or the AR experience, wherein the scanner includes a radio-frequency identification (RFID) scanner or a near-frequency communication (NFC) scanner.

Example 21 includes the subject matter of Example 19 or 20, wherein the output further comprises at least one of a vibration output, a motion output, and a light output, wherein location tracking includes comparing timings of the reception of the output at the computing device and initiation, by the computing device, of the output at the object.

Example 22 includes the subject matter of Example 20, wherein location tracking is further performed based on changes in and the timings of the output, wherein location tracking further includes detecting one or more of movement, direction, deviation, stoppage, and sound relating to the object based on the output.

Example 23 includes the subject matter of Example 20 or 22, wherein location tracking is performed by one or more cameras, wherein the one or more cameras to capture one or more of images and video streams of the object.

Example 24 includes the subject matter of Example 19, wherein the mechanism is further to determine one or more responses at the database matching the output, wherein the database maintains information relating to the object, wherein the one or more responses are obtained from the information at the database that is communicatively coupled to the computing device.

Example 25 includes the subject matter of Example 19 or 24, wherein the AR experience is rendered based on the one or more responses, wherein the one or more responses represent one or more behaviors of the object being part of the AR experience, wherein the one or more responses include at least one of presenting the AR experience in a video recording of the object, adding colors to the object to enable tracking of the object using the output, adding sound to the video recording of the object, and adding position data to track the object.

Example 26 includes the subject matter of Example 19, wherein the mechanism is further to detect, by a context sensor of a sensor array hosted by the computing device, location or activities of the object to determine one or more contexts relating to the object, wherein the one or more contexts are used to alter the one or more behaviors of the object, wherein the context sensor includes an environmental sensor.

Example 27 includes the subject matter of Example 19, wherein the mechanism is further to: authenticate the object based on predetermined criteria including one or more of unique identification, registration, or passcode relating to the object, wherein authentication is performed via a user interface; and transmit the output to one or more computing devices over communication medium to process the output at the one or more computing devices, wherein processing includes accessing the supplemental information obtained from the database or determining the one or more responses, wherein the one or more computing devices include one or more server computers communicatively part of the communication medium including at least one of a proximity network, a cloud network, or the Internet.

Some embodiments pertain to Example 28 includes an apparatus comprising: means for scanning, by a scanner of the apparatus, an object, wherein the object includes an unpowered object, and wherein the scanner is further to detect a smart tag at the object; means for providing power, by the apparatus, to the object, wherein the power is provided via the smart tag at the object, wherein providing power includes initiating an output from the object to enable performing of location tracking of the object, wherein the output is received by the apparatus; and means for rendering an augmented reality (AR) experience involving the object, wherein the AR experience is based on the output.

Example 29 includes the subject matter of Example 28, wherein the output comprises at least one of a video output or an audio output to allow accessing of a database to match the object with contents at the database to retrieve supplemental information regarding video characteristics and audio characteristics, respectively, of the object to enable at least one of the location tracking or the AR experience, wherein the scanner includes a radio-frequency identification (RFID) scanner or a near-frequency communication (NFC) scanner.

Example 30 includes the subject matter of Example 28 or 29, wherein the output further comprises at least one of a vibration output, a motion output, and a light output, wherein location tracking includes comparing timings of the reception of the output at the apparatus and initiation, by the apparatus, of the output at the object.

Example 31 includes the subject matter of Example 29, wherein location tracking is further performed based on changes in and the timings of the output, wherein location tracking further includes detecting one or more of movement, direction, deviation, stoppage, and sound relating to the object based on the output.

Example 32 includes the subject matter of Example 28 or 31, wherein location tracking is performed by one or more cameras, wherein the one or more cameras to capture one or more of images and video streams of the object.

Example 33 includes the subject matter of Example 28, further comprising means for determining one or more responses at the database matching the output, wherein the database maintains information relating to the object, wherein the one or more responses are obtained from the information at the database that is communicatively coupled to the apparatus.

Example 34 includes the subject matter of Example 28 or 33, wherein the AR experience is rendered based on the one or more responses, wherein the one or more responses represent one or more behaviors of the object being part of the AR experience, wherein the one or more responses include at least one of presenting the AR experience in a video recording of the object, adding colors to the object to enable tracking of the object using the output, adding sound to the video recording of the object, and adding position data to track the object.

Example 35 includes the subject matter of Example 28, further comprising means for detecting, by a context sensor of a sensor array hosted by the apparatus, location or activities of the object to determine one or more contexts relating to the object, wherein the one or more contexts are used to alter the one or more behaviors of the object, wherein the context sensor includes an environmental sensor.

Example 36 includes the subject matter of Example 28, further comprising: means for authenticating the object based on predetermined criteria including one or more of unique identification, registration, or passcode relating to the object, wherein authentication is performed via a user interface; and means for transmitting the output to one or more computing devices over communication medium to process the output at the one or more computing devices, wherein processing includes accessing the supplemental information obtained from the database or determining the one or more responses, wherein the one or more computing devices include one or more server computers communicatively part of the communication medium including at least one of a proximity network, a cloud network, or the Internet.

Example 37 includes at least one non-transitory machine-readable medium comprising a plurality of instructions, when executed on a computing device, to implement or perform a method as claimed in any of claims or examples 10-18.

Example 38 includes at least one machine-readable medium comprising a plurality of instructions, when executed on a computing device, to implement or perform a method as claimed in any of claims or examples 10-18.

Example 39 includes a system comprising a mechanism to implement or perform a method as claimed in any of claims or examples 10-18.

Example 40 includes an apparatus comprising means for performing a method as claimed in any of claims or examples 10-18.

Example 41 includes a computing device arranged to implement or perform a method as claimed in any of claims or examples 10-18.

Example 42 includes a communications device arranged to implement or perform a method as claimed in any of claims or examples 10-18.

Example 43 includes at least one machine-readable medium comprising a plurality of instructions, when executed on a computing device, to implement or perform a method or realize an apparatus as claimed in any preceding claims or examples.

Example 44 includes at least one non-transitory machine-readable medium comprising a plurality of instructions, when executed on a computing device, to implement or perform a method or realize an apparatus as claimed in any preceding claims or examples.

Example 45 includes a system comprising a mechanism to implement or perform a method or realize an apparatus as claimed in any preceding claims or examples.

Example 46 includes an apparatus comprising means to perform a method as claimed in any preceding claims or examples.

Example 47 includes a computing device arranged to implement or perform a method or realize an apparatus as claimed in any preceding claims or examples.

Example 48 includes a communications device arranged to implement or perform a method or realize an apparatus as claimed in any preceding claims or examples.

Some embodiments pertain to Example 49 includes a system comprising: one or more sensors of a sensory array to detect, via device proximity detection module, an object; a scanner to scan the object, wherein the object includes an unpowered object, and wherein the scanner is further to detect a smart tag at the object, wherein the scanner is further to facilitate providing power to the object, wherein the power is provided via the smart tag at the object, wherein the scanner is further to initiate an output from the object to perform location tracking of the object, wherein the output is received by system; and one or more components to render an AR experience involving the object, wherein the AR experience is based on the output, wherein the one or more components include.

Example 50 includes the subject matter of Example 49, wherein the sensory array includes one or more of a microphone, a camera, an environment sensor, or a capacitance component, wherein the camera is further to capture one or more of images and video streams of the object, wherein the sensor includes a radio-frequency identification (RFID) scanner or a near-frequency communication (NFC) scanner, wherein the one or more components include at least one of one or more of: object and gesture recognition system to recognize and track one or more gestures of a user; direction of attention module to facilitate, using the sensor array, tracking of positions or orientations of the object or the user; and screen rendering module to facilitate the AR experience by rendering a virtual object associated with the object on one or more virtual screens.

Example 51 includes the subject matter of Example 50, wherein the output comprises at least one of a video output or an audio output to access a database to match the object with contents at the database to retrieve supplemental information regarding video characteristics and audio characteristics, respectively, of the object to enable at least one of the location tracking or the AR experience, wherein the output further comprises at least one of a vibration output, a motion output, and a light output, wherein the coordination and tracking logic is further to compare timings of the reception of the output at the system and initiation of the output at the object, wherein location tracking is further performed based on changes in and the timings of the output, wherein location tracking includes detecting one or more of movement, direction, deviation, stoppage, and sound relating to the object based on the output.

Example 52 includes the subject matter of Example 51, wherein the AR experience is further facilitated using one or more of: virtual object behavior module to render the virtual object and one or more virtual scenes relating to the object; virtual object tracker module to track the virtual object as it moves within the one or more virtual scenes; gesture to view and screen synchronization module to receive a selection of views and screens relating to the virtual object and the one or more virtual scenes to determine an active view or scene of the selection of views and scenes, respectively; adjacent screen perspective module to determine coordinates of an adjacent scene; object velocity and direction module to estimate dynamics of the virtual object corresponding to the object; momentum and inertia module to estimate a velocity or a direction of the object in a space or on a display screen; three-dimensional (3D) interaction and effects module to track user interactions with 3D images by the user via one or more user interfaces; and command execution module to cache and execute one or more commands to facilitate one or more tasks including the AR experience.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

What is claimed is:

1. An apparatus comprising:
a scanner to scan, via scanning and powering logic, an object, wherein the object includes an unpowered object, and wherein the scanner is further to detect, via detection/reception logic, a smart tag at the object;
the scanning and powering logic to provide power to the object, wherein the power is provided via the smart tag at the object, wherein the scanning and powering logic is further to initiate an output from the object to enable data stream coordination and tracking logic to perform location tracking of the object, wherein the output is received by the detection/reception logic and comprises at least one of a video output or an audio output to allow response and application logic to access a database to match the object with contents at the database to retrieve supplemental information regarding at least one of video characteristics or audio characteristics of the object to perform at least one of the location tracking or the AR experience; and
augmented reality (AR) logic to render an AR experience involving the object, wherein the AR experience is based on the output.

2. The apparatus of claim 1, wherein the scanner includes a radio-frequency identification (RFID) scanner or a near-frequency communication (NFC) scanner.

3. The apparatus of claim 2, wherein the output further comprises at least one of a vibration output, a motion output, and a light output, wherein the coordination and tracking logic is further to compare timings of the reception of the output at the apparatus and initiation, by the data stream coordination and tracking logic, of the output at the object.

4. The apparatus of claim 2, wherein location tracking is further performed based on changes in and the timings of the output, wherein location tracking includes detecting one or more of movement, direction, deviation, stoppage, and sound relating to the object based on the output.

5. The apparatus of claim 4, wherein location tracking is performed by one or more cameras, wherein the one or more cameras to capture one or more of images and video streams of the object.

6. The apparatus of claim 2, wherein the response and application logic is to determine one or more responses at the database matching the output, wherein the database maintains information relating to the object, wherein the one or more responses are obtained from the information at the database that is communicatively coupled to the apparatus.

7. The apparatus of claim 6, wherein the AR logic is further to apply the one or more responses to render the AR experience, wherein the one or more responses represent one or more behaviors of the object being part of the AR experience, wherein the one or more responses include at least one of presenting the AR experience in a video recording of the object, adding colors to the object to enable tracking of the object using the output, adding sound to the video recording of the object, and adding position data to track the object.

8. The apparatus of claim 1, further comprising context engine to detect, via a context sensor of a sensor array, location or activities of the object to determine one or more contexts relating to the object, wherein the context engine is further to alter, based on the one or more contexts, the one or more behaviors of the object, wherein the context sensor includes an environmental sensor.

9. The apparatus of claim 1, further comprising:
authentication logic to authenticate the object based on predetermined criteria including one or more of unique identification, registration, or passcode relating to the object, wherein authentication is performed via a user interface; and
communication/compatibility logic to transmit the output to one or more computing devices over communication medium to process the output at the one or more computing devices, wherein processing includes accessing the supplemental information obtained from the database or determining the one or more responses, wherein the one or more computing devices include one or more server computers communicatively part of the communication medium including at least one of a proximity network, a cloud network, or the Internet.

10. A method comprising:
scanning, by a scanner of a computing device, an object, wherein the object includes an unpowered object, and wherein the scanner is further to detect a smart tag at the object;
providing power, by the computing device, to the object, wherein the power is provided via the smart tag at the object, wherein providing power includes initiating an output from the object to enable performing of location tracking of the object, wherein the output is received by the computing device and comprises at least one of a video output or an audio output to allow response and application logic to access a database to match the object with contents at the database to retrieve supplemental information regarding at least one of video characteristics or audio characteristics of the object to perform at least one of the location tracking or the AR experience; and
rendering an augmented reality (AR) experience involving the object, wherein the AR experience is based on the output.

11. The method of claim 10, wherein the scanner includes a radio-frequency identification (RFID) scanner or a near-frequency communication (NFC) scanner.

12. The method of claim 11, wherein the output further comprises at least one of a vibration output, a motion output, and a light output, wherein location tracking includes comparing timings of the reception of the output at the computing device and initiation, by the computing device, of the output at the object.

13. The method of claim 11, wherein location tracking is further performed based on changes in and the timings of the output, wherein location tracking further includes detecting one or more of movement, direction, deviation, stoppage, and sound relating to the object based on the output.

14. The method of claim 13, wherein location tracking is performed by one or more cameras, wherein the one or more cameras to capture one or more of images and video streams of the object.

15. The method of claim 11, further comprising determining one or more responses at the database matching the output, wherein the database maintains information relating to the object, wherein the one or more responses are obtained from the information at the database that is communicatively coupled to the computing device.

16. The method of claim 15, wherein the AR experience is rendered based on the one or more responses, wherein the one or more responses represent one or more behaviors of the object being part of the AR experience, wherein the one or more responses include at least one of presenting the AR experience in a video recording of the object, adding colors to the object to enable tracking of the object using the output, adding sound to the video recording of the object, and adding position data to track the object.

17. The method of claim 10, further comprising detecting, by a context sensor of a sensor array hosted by the computing device, location or activities of the object to determine one or more contexts relating to the object, wherein the one or more contexts are used to alter the one or more behaviors of the object, wherein the context sensor includes an environmental sensor.

18. The method of claim 10, further comprising:
authenticating the object based on predetermined criteria including one or more of unique identification, registration, or passcode relating to the object, wherein authentication is performed via a user interface; and
transmitting the output to one or more computing devices over communication medium to process the output at the one or more computing devices, wherein processing includes accessing the supplemental information obtained from the database or determining the one or more responses, wherein the one or more computing devices include one or more server computers communicatively part of the communication medium including at least one of a proximity network, a cloud network, or the Internet.

19. At least one non-transitory machine-readable storage medium comprising a plurality of instructions stored thereon, the instructions when executed on a computing device, cause the computing device to:
scan, via a scanner, an object, wherein the object includes an unpowered object, and wherein the scanner is further to detect a smart tag at the object;
provide power to the object, wherein the power is provided via the smart tag at the object, wherein providing power includes initiating an output from the object to enable performing of location tracking of the object, wherein the output is received by the computing device and comprises at least one of a video output or an audio output to allow response and application logic to access a database to match the object with contents at the database to retrieve supplemental information regarding at least one of video characteristics or audio characteristics of the object to perform at least one of the location tracking or the AR experience; and
render an augmented reality (AR) experience involving the object, wherein the AR experience is based on the output.

20. The machine-readable storage medium of claim 19, wherein the output further comprises at least one of a vibration output, a motion output, and a light output, wherein location tracking includes comparing timings of the reception of the output at the computing device and initiation, by the computing device, of the output at the object, wherein the scanner includes a radio-frequency identification (RFID) scanner or a near-frequency communication (NFC) scanner.

21. The machine-readable storage medium of claim 20, wherein location tracking is further performed based on changes in and the timings of the output, wherein location tracking further includes detecting one or more of movement, direction, deviation, stoppage, and sound relating to the object based on the output, wherein location tracking is performed by one or more cameras, wherein the one or more cameras to capture one or more of images and video streams of the object.

22. The machine-readable storage medium of claim 20, wherein the computing device is to determine one or more responses at the database matching the output, wherein the database maintains information relating to the object, wherein the one or more responses are obtained from the information at the database that is communicatively coupled to the computing device.

23. The machine-readable storage medium of claim 22, wherein the AR experience is rendered based on the one or more responses, wherein the one or more responses represent one or more behaviors of the object being part of the AR experience, wherein the one or more responses include at least one of presenting the AR experience in a video recording of the object, adding colors to the object to enable tracking of the object using the output, adding sound to the video recording of the object, and adding position data to track the object.

24. The machine-readable storage medium of claim 23, wherein the computing device is further to detect, by a context sensor of a sensor array hosted by the computing device, location or activities of the object to determine one or more contexts relating to the object, wherein the one or more contexts are used to alter the one or more behaviors of the object, wherein the context sensor includes an environmental sensor.

25. The machine-readable storage medium of claim 19, wherein the computing device is further to:
authenticate the object based on predetermined criteria including one or more of unique identification, registration, or passcode relating to the object, wherein authentication is performed via a user interface; and
transmit the output to one or more computing devices over communication medium to process the output at the one or more computing devices, wherein processing includes accessing the supplemental information obtained from the database or determining the one or more responses, wherein the one or more computing devices include one or more server computers communicatively part of the communication medium including at least one of a proximity network, a cloud network, or the Internet.

26. A system comprising:
one or more sensors of a sensory array to detect, via device proximity detection module, an object;
a scanner to scan the object, wherein the object includes an unpowered object, and wherein the scanner is further to detect a smart tag at the object,
wherein the scanner is further to facilitate providing power to the object, wherein the power is provided via the smart tag at the object, wherein the scanner is further to initiate an output from the object to perform location tracking of the object, wherein the output is received by system and comprises at least one of a video output or an audio output to allow response and application logic to access a database to match the object with contents at the database to retrieve supplemental information regarding at least one of video characteristics or audio characteristics of the object to perform at least one of the location tracking or the AR experience; and
one or more components to render an AR experience involving the object, wherein the AR experience is based on the output.

27. The system of claim 26, wherein the sensory array includes one or more of a microphone, a camera, an environment sensor, or a capacitance component, wherein the camera is further to capture one or more of images and video streams of the object, wherein the sensor includes a radio-frequency identification (RFID) scanner or a near-frequency communication (NFC) scanner, wherein the one or more components include at least one of one or more of:

object and gesture recognition system to recognize and track one or more gestures of a user;

direction of attention module to facilitate, using the sensor array, tracking of positions or orientations of the object or the user; and screen rendering module to facilitate the AR experience by rendering a virtual object associated with the object on one or more virtual screens.

28. The system claim 27, wherein the output further comprises at least one of a vibration output, a motion output, and a light output, wherein the coordination and tracking logic is further to compare timings of the reception of the output at the system and initiation of the output at the object, wherein location tracking is further performed based on changes in and the timings of the output, wherein location tracking includes detecting one or more of movement, direction, deviation, stoppage, and sound relating to the object based on the output.

29. The system of claim 28, wherein the AR experience is further facilitated using one or more of:

virtual object behavior module to render the virtual object and one or more virtual scenes relating to the object;

virtual object tracker module to track the virtual object as it moves within the one or more virtual scenes;

gesture to view and screen synchronization module to receive a selection of views and screens relating to the virtual object and the one or more virtual scenes to determine an active view or scene of the selection of views and scenes, respectively;

adjacent screen perspective module to determine coordinates of an adjacent scene; object velocity and direction module to estimate dynamics of the virtual object corresponding to the object;

momentum and inertia module to estimate a velocity or a direction of the object in a space or on a display screen;

three-dimensional (3D) interaction and effects module to track user interactions with 3D images by the user via one or more user interfaces; and command execution module to cache and execute one or more commands to facilitate one or more tasks including the AR experience.

\* \* \* \* \*